Dec. 24, 1935.  C. G. BRIEL  2,025,327
METHOD OF AND APPARATUS FOR PRODUCING COMPOSITE PICTURES
Filed April 25, 1931
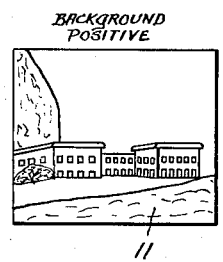
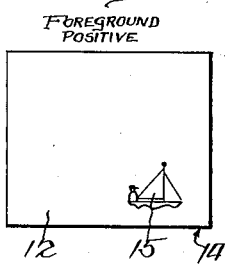
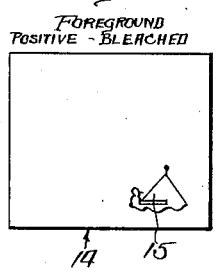
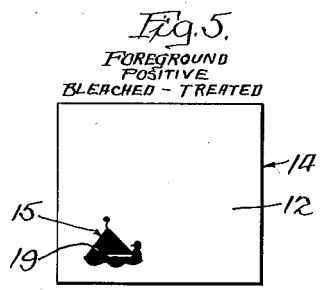
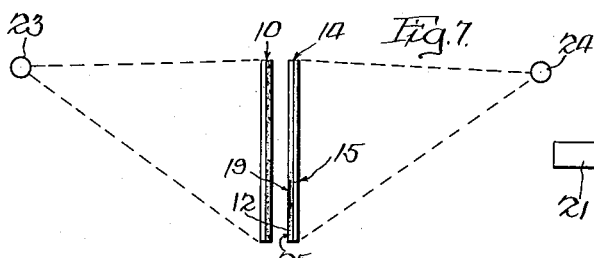
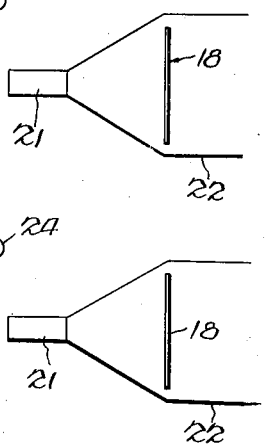
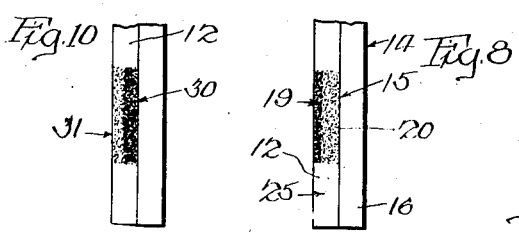
Inventor:
Conrad G. Briel.

Patented Dec. 24, 1935

2,025,327

UNITED STATES PATENT OFFICE 2,025,327

METHOD OF AND APPARATUS FOR PRODUCING COMPOSITE PICTURES

Conrad G. Briel, Chicago, Ill., assignor to Cinema Development Company, Chicago, Ill., a corporation of Illinois Application April 25, 1931, Serial No. 532,840

12 Claims. (Cl. 88—16)

This invention relates to a method of producing composite pictures in photography.

More particularly, the invention relates to a simple, accurate, rapid and inexpensive method of superimposing foreground images upon backgrounds whereby composite photographs may be produced entirely from previously taken films, or from a combination of previously taken films and objects, such as studio actions and background scenery. The method disclosed herein requires a single exposure to produce the composite photograph and eliminates many undesirable features heretofore experienced in this art.

Specifically, the present invention is directed to providing a foreground image upon a photographic emulsion that may or may not be light reflective and thereafter treating a portion of the image particles so that after the treatment the entire image is opaque to but reflective of light. In certain respects, it is an object of the present invention to provide a foreground image that is treated to secure light opacity and reflectivity without necessarily requiring the application of a coating, thereby enabling this foreground component to be easily, accurately, and rapidly made in minimum time. Providing the foreground component in this manner to be opaque to and reflective of light permits any number of foregrounds to be combined with a background, by a single exposure, and further allows the use of any standard film as a background without requiring alteration or treatment thereof.

In order to apprise those skilled in the art how to construct and practice my invention, I shall now describe a preferred embodiment thereof in connection with the accompanying drawing, which forms a part hereof.

In the drawing:

Figure 1 is a front elevation of a positive background scene, the film being that usually employed in photography;

Fig. 2 is a negative of the background scene shown in Fig. 1;

Fig. 3 is a positive image on a film to be used as a foreground;

Fig. 4 is the same positive image on the film shown in Fig. 3 after the image has been bleached to a whiteness;

Fig. 5 is the same positive shown in Fig. 3 after being treated in accordance with the teachings of the present invention to render it relatively opaque to and reflective of light;

Fig. 6 illustrates a finished positive composite picture carrying the images of the foreground and background thereon as a completed picture;

Fig. 7 illustrates one of the various ways of placing a foreground film, containing the image, adjacent to the background film, and controlling the illumination to permit photographing;

Fig. 8 is an enlarged view of the portion of the foreground film carrying the image and looking at one side or edge of the film to show the condition of the image forming grains after being treated to render the inner grains reflective of light and the surface grains relatively opaque to light and relatively non-reflective of light;

Fig. 9 is a view similar to Fig. 7 but illustrating an alternative embodiment of the invention; and Fig. 10 is a view similar to Fig. 8 and illustrating an enlarged view of the image portion of the foreground film used in the arrangement shown in Fig. 9.

The photographic film used may be the usual black and white diapositives, such as the ordinary cinema projecting film, or plates used in still photography, or they may be paintings on plates, depending upon the characters or images to be combined and the superimposing to be done, it being also understood that the background may be the actual background scenery, as well as film or paintings.

When the extensively used present-day film is developed, the images are formed by the fixation of innumerable minute particles of metallic silver imbedded in the gelatin of the photographic emulsion, there being relatively more silver particles in the shadows than in the highlights, but somewhat uniformly distributed throughout the depth of the photographic emulsion. The present invention is very well adapted to this type of photographic film, but it will be understood that the invention might well be applied to other film where the images are produced in a different manner or have different physical characteristics.

As shown in the drawing, the background may be scenery or other objects in the form of a painting or photographic film, and may be produced by making a negative 10. Positive print 11 of negative 10 is shown in Fig. 1.

As a specific example, the foreground film 14 shown in Fig. 3 may be the usual diapositive, such as the ordinary cinema projecting film, having the area 12 about the image 15 transparent and the image 15 comprising metallic silver imbedded in the photographic emulsion carried by the base of the film. The action or objects, of which foreground image 15 is composed, may be photographed in front of a white ground, so that, when a positive print is made from the negative, the area about the image will be transparent or relatively free from silver deposit.

While one of the features of the present invention resides in making the foreground image itself reflective of light, it will be understood that the same results may be accomplished where image 15 is either inherently reflective of light, or has otherwise been previously treated to be reflective of light for any purpose whatsoever. This step may be accomplished by bleaching the silver image in any well known way so that the image will be changed into a light figure, or into a substance which reflects light.

I do not wish to be limited to the particular way this step of the invention is accomplished, but suggest bleaching image 15 to a whiteness as one method of obtaining the desired results, the density of the whiteness varying according to the density of the metallic silver, with a corresponding variation of reflectivity for light to effect a correct reproduction of the image and its details when photographed upon film 18.

Bleaching a silver image on a film is a step well known in the art. As an example, I suggest the use of a reagent comprising mercuric chloride and potassium bromide, which changes the metallic silver into a complex silver mercury bromide. The density of the image may be somewhat built up in the bleaching action, but this is not necessary for the purpose of the present invention, because it may be said that it is quite desirable to control the intensification of the image and even restrict it as much as possible so that the density and contrast of the image will remain quite uniform throughout the steps of the process.

I have found that after image 15 is bleached, as shown in Fig. 4, it is desirable to dip or pass the film quickly through any well known developing solution so that the surface particles comprising the complex silver mercury bromide of the bleached image will be darkened to form a backing for the bleached image 15, which backing will be relatively opaque to transmitted light and permit the remaining particles of silver mercury bromide of the bleached image 15 to reflect light.

While it is not essential to the present invention, it may be found desirable to bleach and redevelop image 15 on foreground film 14 several times, this depending upon the condition of the original metallic silver forming image 15.

Any suitable redeveloper may be used. I suggest, for example, however, the use of silver nitrate and potassium cyanide, which, when together in solution, form silver potassio cyanide, the latter acting upon the silver mercury bromide and having the effect of darkening it.

Fig. 8 illustrates the manner in which the redeveloper darkens the silver mercury bromide along the surface of the photographic emulsion 25, the darkened portion being designated 19 and the inner bleached portion comprising silver mercury bromide being designated 20.

It will be specifically understood that the above examples are given merely for the purpose of explanation, and the broad invention is not to be limited to any specific bleaching and redeveloping reagent, inasmuch as I have found that practically any well known bleaching reagent and redeveloping reagent may be used.

I have also found it desirable, although not essential, to dip the foreground film 14 momentarily in a development inhibiting reagent after this film has been removed from the redeveloper bath so as to control the formation of the darkened portion or backing 19, if found necessary.

The next step in the method herein disclosed consists in placing the negative background film 10 and the positive foreground film 14, after the latter has been treated in the manner above described, in superposed relation. As illustrated in Fig. 7, background negative 10 and treated foreground positive 14 need not be in actual contact, but may be arranged in any suitable position and in the focal plane of lens 21 of camera 22, and in the focal plane of unexposed film 18. By proper lighting effects, these films may be illuminated so that they may be photographed by camera 22, or otherwise exposed to film 18, and a composite picture produced upon film 18, which film in this case will be a positive.

The particular step of illuminating films 10 and 14 may be varied from that shown in Fig. 7, but, as illustrated it is preferred to use a light 23 to illuminate the background negative 10 by transmitted light and to use a light 24 to illuminate the foreground image 15 on film 14 by reflected light. The illuminating lights 23 and 24 may be placed in any suitable position to secure the desired results. The rays of illuminator 23 will pass through the background negative 10 so that its details will appear on film 18 except where the foreground image 15 appears on the foreground film 14. The darkened surface 19 of image 15 serves to prevent the passage of light of illuminator 23 through its area. Bleaching the foreground image 15 presents the effect of reflecting the rays of light from illuminator 24 so that the details of this foreground image will appear clear and distinct in the composite picture on film 18, as shown in Figure 6, while the partial redeveloping of bleached image 15 causing the surface portion thereof to darken serves to prevent transmission of light therethrough from illuminator 23.

The particular relative arrangement of background negative 10 and treated foreground positive 14 may vary with respect to each other, but I have shown a preferred arrangement in Fig. 7 wherein the emulsion side 25 of film 14 is away from the lens 21, the base 16 of film 14 thereby facing this lens. The emulsion sides of these two films may face each other, as shown in Fig. 7, but it will be apparent to one skilled in the art that this arrangement may be the reverse or may vary somewhat.

Bleaching the image of the foreground positive 14, as shown in Fig. 4, will preferably necessitate the use of a negative for the background when superimposing in accordance with the arrangement shown in Fig. 7. Bleaching and partial redevelopment of foreground image 15 causes, in effect, a change of the positive 14 into a negative. This arrangement will cause film 18 to be a positive. Fig. 6 illustrates a complete composite picture of the images as formed on film 18, and as shown in the background and foreground films illustrated in the drawing. The treatment of image 15, after it is bleached, in order to accomplish the herein desired results, need only be such as will prevent the transmission of the rays of light from illuminator 23. Dipping or momentarily passing foreground 14 through the redeveloping solution after image 15 is bleached, causes the surface portion 19 to assume a sepia tone. The broad concept of the invention is not limited, however, to producing any particular tone as long as the effect accomplished is to secure sufficient opacity whereby the bleached portion 20 of image 15 will reflect rays of light from illuminator 24 or its equivalent to produce the proper details of this image when photographed.

In so far as the steps of bleaching and redeveloping are concerned, it is evident to one skilled in the art that they may be varied or modified considerably without departing from the broad scope of the invention.

Producing composite pictures with the present method is extremely simple, rapid and inexpensive, because it eliminates the use of dyes and colored lights and the use of mats and tedious blocking out, as in methods heretofore known.

It is also mentioned that the use of the foreground component 14, as treated in the manner described herein, is not necessarily limited to superpositioning with a background, or background film illuminated by transmitted light, inasmuch as the background component may be illuminated in other ways, as, for example, by reflected light.

An alternative embodiment of the invention is disclosed in Figs. 9 and 10. A foreground positive 14 is used which is substantially the same as shown in Fig. 3, with image 15 consisting of oriented discrete particles of metallic silver 30 embedded in the photographic emulsion and with the area 12 surrounding the image transparent or substantially transparent. To secure the desired treatment of image 15 to render it opaque to and reflective of light, foreground positive 14 is dipped into a bleaching reagent, which may be similar to that above described if so desired, although not limited thereto, until the surface particles are bleached to a substantial whiteness, this step being controlled to the extent of restricting the bleaching action upon the surface particles to a depth sufficient to produce a backing 31 having the necessary opacity to prevent light rays from illuminator 23 from penetrating therethrough to show the details of the background through this image 15 upon the composite picture. Image 15 will therefore consist of particles of silver 30, which are preferably not treated, and which together with the bleached particles are capable of reflecting light rays from illuminator 24 to show the image details distinctly and clearly upon the composite picture, the illumination of the background not interfering therewith due to the relative opacity of backing 31.

By treating the foreground image 15 in this manner, film 14 is not in effect changed into a negative, and consequently, the background component may be the positive film 11, as shown in Figs. 1 and 9, instead of the negative film 10, as shown in Figs. 2 and 7. When foreground 14 and background 11 are arranged as shown in Fig. 9, light 23 will act to illuminate the background by transmitted light, its rays also passing through the transparent area 12 of foreground 14, while light 24 will act to illuminate foreground image 15 by reflected light. It will be understood, as in the case of the embodiment of the invention shown in Figs. 1 to 8 inclusive, that background component may be illuminated by reflected light, if so desired, and that this background may be a painting, natural scenery, etc.

Treated portion 31 of image 15, which has been whitened, serves to render image 15 opaque to and reflective of light, so that its details will appear upon and as part of the composite picture, without the details of the background showing therethrough. I have found that the same results can be accomplished as long as portion 31 is of a lighter color than portion 30, and therefore, it is not essential that portion 31 be treated to a whiteness.

From the foregoing description, it will be obvious that the broad invention includes, in the method of making composite pictures, treating an image component whereby a portion thereof becomes or acts as a backing or coating to render the image opaque to and reflective of light. If the image itself is reflective of light, as in the case of first bleaching the image to a whiteness or being in a condition capable of reflecting light, it may be treated to produce a darkened portion 19 at the surface. If the image itself is not reflective of light, it may be treated to produce the light colored portion 31 at the surface.

Other advantages and objects will be apparent to those skilled in the art, and therefore I do not wish to be limited to the exact details or steps described and shown herein, since many modifications are possible without departing from the spirit and scope of the invention.

I claim:

1. The method of producing a composite photograph embodying two or more component parts that includes simultaneously exposing a fresh actinic surface to one component with a photographic image of the other component interposed, said photographic image being treated by converting the particles occupying a portion of the depth of the image into a substance having a tone relatively opposite to that of the remaining particles thereof so that said toned substance together with said remaining particles make, in themselves, said photographic image opaque to but reflective of light, and illuminating said photographic image and said first component during their simultaneous exposure to impress the image details of both components on said fresh actinic surface.

2. The method of producing a composite photograph embodying two or more component parts that includes providing an image of one component, making an image of the other component reflective of light by bleaching substantially to whiteness, then treating the bleached image to tone only the surface portion thereof so as to make the surface portion relatively opaque to light and relatively non-reflective of light, superposing the two images and illuminating the same, and exposing a fresh actinic surface to the first image and the second image so superposed and illuminated.

3. The method of producing a composite photograph embodying two or more component parts, that includes providing an image of one component, making an image of the other component in the form substantially of a light reflective substance and thereafter chemically treating the surface of the light reflective substance to relatively darken the same and thereby render the surface opaque to light and relatively non-reflective of light, superposing the two images and illuminating the first image by transmitted light and the second image by reflected light, and exposing a fresh actinic surface to the first image and the second image so superposed and illuminated.

4. A foreground film having an image consisting of oriented discrete light-reflective particles embedded in a colloid carrier and light absorbing particles at the surface of said carrier so disposed as to be optically aligned with the light-reflective particles to render the image area opaque.

5. The method of producing a foreground film having an image of the characteristics described which comprises bleaching to whiteness all of the image particles of said film and then blackening the image particles at and near the surface of the film to a density to render the image opaque, without blackening the more deeply embedded particles.

6. A layer of a colloid substance, image particles of a white opaque substance distributed in said layer, and dark image particles of opaque substance at one surface of said layer of a density to render the image opaque to light.

7. A photographic film having an image consisting of oriented discrete particles embedded in a colloid carrier, and a layer of image particles at the surface of said carrier which have been toned to a tone relatively opposite to that of the remaining particles so that said toned particles together with said remaining particles, in themselves, make the image in its entirety opaque to but reflective of light.

8. The method of producing a foreground film which comprises bleaching the image completely through and thereupon redeveloping only a portion of the depth of the emulsion to make the surface particles of the image opaque to and relatively non-reflective of light.

9. A photographic film having an image consisting of oriented discrete particles embedded in a colloid carrier, a portion of said particles being toned to a tone relatively opposite to that of the remaining particles so that said toned particles together with said remaining particles, in themselves, make the image in its entirety opaque to but reflective of light.

10. A photographic film having an image consisting of oriented discrete particles, the surface particles of which have been toned to a tone relatively opposite to that of the remaining particles so that said toned particles together with said remaining particles, in themselves, make the image in its entirety opaque to but reflective of light.

11. A foreground film having an image consisting of oriented discrete image particles of silver embedded in a colloid carrier, the layer of image particles at the surface of said carrier being bleached to a relative whiteness.

12. The method of producing a foreground film having an image of the character described which comprises toning the surface portion of the image to a tone relatively opposite to that of the remaining portion by bleaching said surface portion to a relative whiteness to render the image relatively opaque to but reflective of light.

CONRAD G. BRIEL.